United States Patent [19]

Shimizu et al.

[11] 4,264,111

[45] Apr. 28, 1981

[54] HYDRAULIC ANTI-SKID DEVICE

[75] Inventors: Kazuaki Shimizu, Fujisawa; Yoshio Otsuka, Yokohama, both of Japan

[73] Assignee: Nissan Motor Company, Limited, Yokohama, Japan

[21] Appl. No.: 45,680

[22] Filed: Jun. 5, 1979

[30] Foreign Application Priority Data

Jun. 12, 1978 [JP] Japan ................... 53-71210

[51] Int. Cl.³ .............................................. B60T 8/02
[52] U.S. Cl. ...................................... 303/115; 303/92; 303/116
[58] Field of Search .......................... 303/113–119, 303/92; 188/181

[56] References Cited

U.S. PATENT DOCUMENTS

| | | | |
|---|---|---|---|
| 3,672,731 | 6/1972 | Koivuner | 303/115 |
| 3,963,276 | 6/1976 | Atkins | 303/92 |
| 4,132,451 | 1/1979 | Shimizu | 303/92 X |

FOREIGN PATENT DOCUMENTS 49-132466 12/1974 Japan .

1409207 10/1975 United Kingdom .

*Primary Examiner*—Douglas C. Butler
*Attorney, Agent, or Firm*—Schwartz, Jeffery, Schwaab, Mack, Blumenthal & Koch

[57] ABSTRACT

An anti-skid device is provided with valving which establishes a first normal pressure transmission path between the master cylinder and the wheel brake cylinders via which an anti-skid pressure reduction can be effected to prevent lock up of the wheels and a second fail safe pressure transmission path which is established in place of the first path upon a malfunction or the like in a source of hydraulic pressure associated with the anti-skid device. The valving is characterized by a valve which is held open (establishing the first pressure transmission path) by abutment with a spool formed with a bore therein. The bore is closed at this time by the stem of the valve which seats in the mouth thereof until the spool moves in response to pump failure or the like to first allow the valve to seat (closing the first path) and subsequently move sufficiently to bring the stem out of contact with the bore mouth (opening the second fail safe path without overlap with the first).

9 Claims, 3 Drawing Figures

HYDRAULIC ANTI-SKID DEVICE

BACKGROUND OF THE INVENTION

The present invention relates to a hydraulic anti-skid device for a braking system of a vehicle.

A prior art anti-skid device has a construction partially shown in FIG. 3 wherein a spool a which moves rightwards, viewing in this Figure, in response to a pump pressure (actuating pressure) serves as the function of an actuator for a needle valve member b which, when in its closed position, obstructs short-circuit communication between a port c connected to a master cylinder and a port d connected to rear wheel cylinders. When the short-circuit communication is obstructed, the master cylinder pressure is transmitted from the port c to a port e through a one-way check valved passageway which is opened by an expansion piston (not shown in FIG. 3) responsive to the pump pressure and the thus transmitted master cylinder pressure is transmitted from the port e to the port d.

When the rear wheels are about to lock, the pump pressure acting upon the expansion piston is exhausted to cause movement of the expansion piston in the opposite direction. This movement of the expansion piston will permit the check valve to be closed to confine the hydraulic line from the check valve to the rear wheel cylinders and then expand the volume of this hydraulic line. As a result, locking of the rear wheels is prevented or released. In the event of loss of the pump pressure due to, for example, failure of a pump, the needle valve b will be open to permit the short-circuit communication between the port c, communicating with the master cylinder, and port d, communicating with the wheel cylinders, thus establishing an unrestricted fluid passageway from the master cylinder to the rear wheel cylinders thereby to prevent skid preventing operation of the system.

However, with the above-described prior art, a problem is derived from the provision of the needle valve b (FIG. 3) which is arranged for selectively connecting the port d to the port c or port e. This problem will be hereinafter explained. The needle valve b will permit overlap between an opening period of a passage opening f and that of another passage opening h because moving the valve b rightwards will urge a rubber valve member g to open the passage opening h before its tip closes the passage opening f and the subsequent leftward return movement will open the passage opening f before closing the passage opening h.

This overlap will take place if the pump pressure drops and will establish temporarily a passageway permitting the master cylinder pressure to leads from the port c to a pressure reduction chamber, to which the expansion piston projects, through the passage opening f, opening h and port e. If, therefore, the pump pressure drops while the master cylinder is being actuated, the hydraulic fluid from the master cylinder will partially be displaced, through the above-mentioned passageway, to the pressure reduction chamber, tending to urge the expansion piston in such a direction as to expand the volume of the reduction chamber, so that depression degree of the brake pedal will increase considerably under this condition. This depression degree of the brake pedal will increase abruptly to cause the driver to feel uneasy if the above mentioned condition takes place during skid preventing operation when, the pressure in the reduction chamber and thus in the wheel cylinders is at low levels.

SUMMARY OF THE INVENTION

According to the present invention, a valve of the type different from the needle valve, as used in the above mentioned system, is provided which will ensure that two passage openings are valved such that one of them is opened after the other has been completely closed.

According to the present invention, there is proposed an anti-skid device for a braking system including a master cylinder and at least one wheel cylinder and associated with a pump, as a source of an actuating pressure, the anti-skid device comprises: a first passageway communicable with the master cylinder which is operable to perform an anti-skid operation; a second passageway communicable with the master cylinder; and a valve device which includes: a chamber communicable with the wheel cylinder, the chamber including a first opening at which the first passageway terminates in and a second opening at which the second passageway terminates in; a valve including a valve member for closing the first opening and a valve stem extending through the first opening toward the second opening; and an actuator for the valve including a pressure responsive piston means formed with the second opening, the pressure responsive piston means being operable in response to the actuating pressure, the pressure responsive piston means being constructed and arranged such that the second opening is closed by the valve stem before the valve member is urged toward an opening position thereof in which the first opening is uncovered.

It is therefore an object of the present invention to provide an anti-skid device free from the previously described overlap which would cause the excessive increase in depression degree of the brake pedal.

BRIEF DESCRIPTION OF THE DRAWINGS

The invention will become more apparent from the following detailed description taken in connection with the accompanying drawings in which.

DESCRIPTION OF THE PREFERRED EMBODIMENTS

Figure 1:
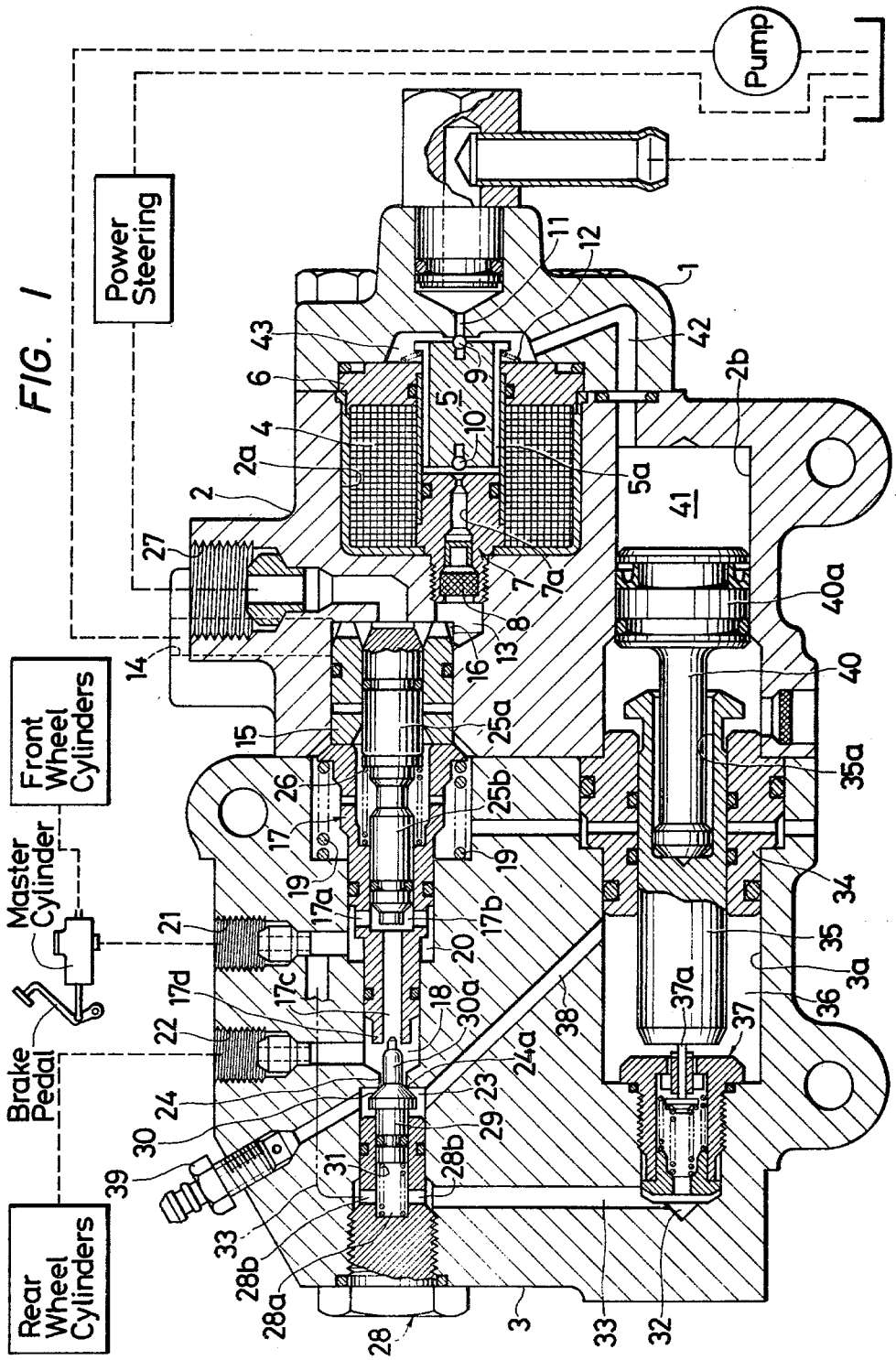
FIG. 1 is a schematic cross sectional view of a preferred embodiment of a hydraulic anti-skid device according to the present invention.

Referring to FIG. 1 showing one form of the construction of an anti-skid device according to the present invention, blocks, designated respectively as 1, 2 and 3, constitute, when assembled, a housing for the device which accommodates various constituent elements. The block 2 is formed with a recess 2a which receives a solenoid 4. With its sleeve portion fitted in the central portion of this solenoid a plunger holder 6 for a plunger 5 slidably received in the sleeve portion is interposed between the blocks 1 and 2. The plunger 5 projects from an open end of the holder 6 and the other open end of the holder 6 is closed with a seal plug 7 formed with a central through hole 7a in which a filter 8 is disposed. The plunger 5 is formed with a plurality of axially extending oil grooves 5a on its outer surface and has balls 9 and 10 embedded thereinto on its axial end surfaces, respectively, with a portion of each ball projecting from the corresponding axial end surface.

The block 1 is formed with a drainage terminating in a drain port 11. Toward this drain port 11, the plunger 5 is urged by a spring 12 till the ball 9 closes the drain port 11. If the solenoid 4 is energized, the plunger 5 will be drawn, against the spring 12, leftwards viewing in this figure and this causes the ball 10 to close the through hole 7a. The through hole 7a is open to a chamber 13 and the block 2 is formed with a pump pressure feed-in port 14 communicating with the chamber 13. A first piston 15 is slidably fitted in the block 2 with one axial end thereof disposed adjacent the end surface of the block 2 and the other axial end exposed to a chamber 16 which is in communication with the chamber 13.

A second piston 17 is slidably fitted in the block 3 with one axial end thereof disposed adjacent the end surface of the block 3 and axially aligned with the first piston to abut on the latter. With a spring 19 the second piston 17 is urged toward the first piston 15. The second piston 17 has the other axial end exposed to a chamber 18 and is successively reduced in diameter toward the other axial end to form a shoulder exposed to a chamber 20. A master cylinder connector port 21 communicates with the chamber 20 and a rear wheel cylinder connector port 22 with the chamber 18. A chamber 23 is formed in an axially opposed position to the chamber 18 and they communicate with each other through a valve hole 24. Communication between the chamber 18 and chamber 20 is established through radial holes 17a, a blind hole 17b and an axial hole 17c with all of which the second piston 17 is formed. The axial hole 17c is in axially aligned and opposed relationship with the valve hole 24.

The first piston 15 is hollow and formed with a central hole. Slidably fitted in this central hole and in the blind bore 17b of the second piston 17 are plungers 25a and 25b, respectively. These plungers are urged in a direction toward the chamber 16 by means of a spring 26. The block 2 is formed with a pressure take-out port 27 opening to the chamber 16 and this port may be connected to a power steering so that the pump pressure may be used for the power steering. With the plunger 25a having an effective surface area exposed to the chamber 16 and urged rightwards due to the pressure in the chamber 20 and spring 26, the degree of communication between the chamber 16 and the port 27 is controllably reduced so that the pressure within the chamber 16 will be maintained at a value determined in response to the resultant urging force.

The chamber 23 is closed by a plug 28 screwed into the block 3 and the plug 28 is formed with a cylindrical chamber 28a into which a piston 29 is fitted. The piston 29 projects at one axial end into the chamber 23 and carries a poppet valve member 30 integrally formed at the one axial end. Referring to the poppet valve, the poppet valve member 30 is arranged within the chamber 23 with its valve stem 30a projecting, through the valve hole 24 with a circumferential play, into the chamber 18 in such a manner that the valve stem will be opposed to the opening 17d of the axial hole 17c. Within the cylinder chamber 28a a spring 31 is disposed to urge the piston 29 toward a position wherein the poppet valve member 30 closes the valve seat 24a of the valve hole 24.

Also formed through the plug 28 are radial holes 28b opening to the cylinder chamber 28a. The block 3 is formed with oil passages 33 which complete a passageway, incorporating these radial holes, establishing communication between the master cylinder connector port 21 and a chamber 32.

The block 3 is formed also with a blind hole 3a and a piston guide 34 is disposed in the blind hole adjacent its open end. An expansion piston 35 slidably extends through the piston guide 34 to define a pressure reduction chamber 36. Between this pressure reduction chamber 36 and the chamber 32 a check valve 37 is provided which prevents, in its normal state, flow of oil from the chamber 32 to the chamber 36. For the purpose of opening this check valve, a valve opener plunger 37a projects from the check valve toward the adjacent axial end surface of the expansion piston 35. The pressure reduction chamber 36 communicates, through a passage 38, with the chamber 23. This chamber is provided with an air bleed valve 39.

The expansion piston 35 is formed with a recess 35a, extending inwardly from the remote axial end surface to the check valve 37, for slidably receiving one end portion of the piston actuator plunger 40. The piston actuator plunger 40 is formed at the other axial end with an enlarged head 40a and has this enlarged head slidably fitted into a blind hole 2b. This enlarged head 40a is exposed to a chamber 41 which communicates, through a passage 42, with a chamber 43.

The operation of the anti-skid device will be explained as follows:

The port 14 receives the pump pressure and this pump pressure, after fed to the chamber 16, will be introduced into the chamber 41 via the chamber 13, filter 8, hole 7a, oil grooves 5a, chamber 43 and oil passage 42. The pump pressure within the chamber 16 will urge the first piston 15 and in turn the second piston 17 in a leftward direction, against the spring 19, and the second piston thus will urge the poppet valve member 30 and in turn the piston 29 in the same direction, against the spring 31, to the limit position shown in FIG. 2. In this position, the valve stem 30a closes the opening 17d at the axial hole 17c and the poppet valve member 30 disengages from the valve seat 24a to open the valve hole 24. The pump pressure introduced into the chamber 41 urges the piston actuating rod 40 leftwards and, after the rod 40 is engaged by the end of the recess 35a, urges the expansion piston 35, in the same direction, to the illustrated position in FIG. 2 wherein the expansion piston opens the check valve 37 by pushing the valve opening stem 37a.

Under this condition, if the master cylinder pressure develops due to depression of the brake pedal, this pressure will be transmitted to the rear wheel cylinders, through the oil passage 33, chamber 32, check valve 37, chamber 36, oil passage 38, chamber 23, valve hole 24 and port 22, thus allowing the normal braking operation. During normal braking operation, the master cylinder pressure in the chambers 18, 20 tends to return the pistons 17, 15 in cooperation with the spring forces of the springs 19, 31, but this tendency is resisted by an increase, in pressure, within the chamber 16 which results from the fact that the master cylinder pressure acting upon the end of the plunger 25b urges the plunger 25b rightwards to suppress the fluid outflow from the chamber 16 toward the port 27. It will now be noted that the above-mentioned tendency of the pistons 17, 15 can be prevented if the effective surface area of the piston 15 is set to such a valve as to provide a force, i.e., a force urging the pistons 15, 17 toward the illustrated position in FIG. 2, large enough to overcome the above-mentioned return force.

When the wheel deceleration is so abrupt to lock the rear wheels, the sensor, which detects this condition, will produce a signal, thus energizing the solenoid 4. The energization of the solenoid 4 will draw the plunger 5 leftwards, viewing in FIG. 1, against the spring 12, thus opening the drain port 11, which have been closed by the ball 9, and closing the hole 7a with the ball 10. Closing of the hole 7a will keep the chamber 16 fed with the pump pressure to maintain the pistons 15, 17 in the illustrated position in FIG. 2, while, opening of the drain port 11 will provide a drainage from the chamber 41 through the oil passage 42 and chamber 43. The reduction, in pressure, in the chamber 43 will allow the rightward movement of the expansion piston 35 due to the brake pressure transmitted to the chamber 36, thus permitting the check valve 37 to become closed thereby to stop the supply of the master cylinder pressure to the rear wheel cylinders. This rightward movement of the expansion piston 35 will also result in the volume expansion in the volume confining the working oil, thus reducing the braking pressure to the rear wheels thereby to automatically relieve the locking condition.

Figure 2:
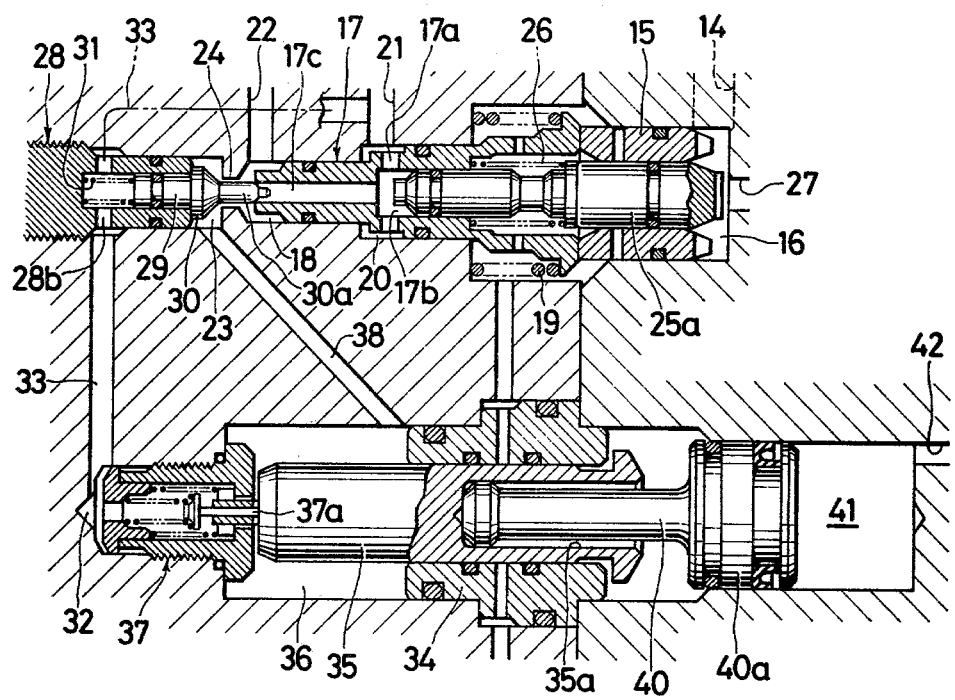
FIG. 2 is a schematic cross sectional view of a part of the anti-skid device of FIG. 2 showing the relative position of parts in a normal braking condition.
Figure 3:
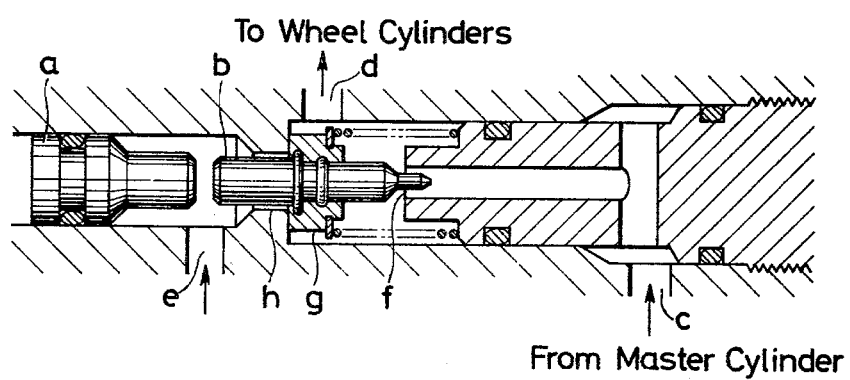
FIG. 3 is a schematic cross sectional view of that part of a prior art hydraulic anti-skid device which shows the needle valve discussed before.

When the pump pressure fails to be supplied to the port 14, the pressure in the chamber 16 will be lost, thus allowing the rightward movement of the second piston 17 and first piston 15 in unison from the FIG. 2 position to the FIG. 1 position due to the action of the spring 19. In an initial stage of this rightward movement, the poppet valve member 30 will move, due to the spring 31, together with the pistons 15, 17, as a unit, with the poppet valve stem 30a maintaining the opening 17d closed until the poppet valve member 30 seats on the valve seat 24a, whereafter the pistons 15, 17 alone will move rightwards, thus permitting the valve stem 30a to separate from the opening 17d to open the axial hole 17c. The failure in supply of the pump pressure will result in a loss in pressure in the chamber 41, thus permitting the check valve 37 to become closed. It will now be understood that the master cylinder pressure fed to the port 21 will be directly fed to the rear wheel cylinders through the chamber 20, hole 17a, blind hole 17b, hole 17c, chambers 18 and port 22 regardless of energization or deenergization of the solenoid 4, thus securing the same braking effect as it would be without the anti-skid device.

It will now be appreciated that the inconvenience that oil passages to be alternatively selected will temporarily form a short-circuit has been completely eliminated, thus solving the problem encountered in the conventional device that depression degree of the brake pedal may increase abruptly when the pump pressure drops, because according to the anti-skid device of the invention a single piece poppet valve member 30 is actuated by the pistons 15, 17 responsive to the presence or absence of the pump pressure and the valve stem 30a of the poppet valve is utilized as a valve member in order to effect a change-over between one pressure transmitting passageway to be established during normal condition and the other one to be established during abnormal condition.

What is claimed is:

1. An anti-skid device for a braking system including a master cylinder and at least one wheel cylinder and associated with a pump, as a source of an actuating pressure, said anti-skid device comprising:
   a first passageway communicable with the master cylinder which is operable to perform an anti-skid operation;
   a second passageway communicable with the master cylinder; and
   a valve device which includes:
   a chamber communicable with the wheel cylinder, said chamber including a first opening at which said first passageway terminates in and a second opening at which said second passageway terminates in;
   a valve including a valve member for closing said first opening and a valve stem extending through said first opening toward said second opening; and
   an actuator for said valve including a pressure responsive piston means formed with said second opening, said pressure responsive piston means being operable in response to the actuating pressure, said pressure responsive piston means being constructed and arranged such that said second opening is closed by said valve stem before said valve member is urged toward an opening position thereof in which said first opening is uncovered.

2. Anti-skid device as claimed in claim 1, wherein said valve member is integral with a second piston means communicable with the master cylinder.

3. Anti-skid device as claimed in claim 2, including a spring urging said valve member toward a closed position thereof in which said first opening is covered.

4. Anti-skid device as claimed in claim 1, including a pressure regulator means for regulating a pressure within a regulator chamber to which said first pressure responsive piston means is exposed, said pressure regulator means including a plunger means received in said first pressure responsive piston means, said plunger means being responsive to a pressure within said second passageway and a pressure within a regulator chamber.

5. In an anti-skid device, having a pump which supplies a control pressure, for use in a wheeled vehicle which has a master cylinder and at least one wheel cylinder,
   means defining a first variable volume passage between said master cylinder and said at least one cylinder,
   means defining a second substantially constant volume passage between said master cylinder and said at least one wheel cylinder,
   first spool means responsive to said control pressure for varying the volume of said first passage,
   second spool means responsive to said control pressure for normally establishing fluid communication between said master cylinder and said at least one wheel cylinder via said first passage and for establishing communication between said master cylinder and said at least one wheel cylinder via said second passage upon the loss of said control pressure, said second spool means comprising:
   a spool having a bore therein which defines part of said second passage, and
   a valve disposed in said first passage, said valve having a stem,
   said spool and said valve being so arranged that when said pump supplies said control pressure said spool is biased to engage said stem in a manner to close said bore and bias said valve to a position wherein said first passage is open and when said control pressure is lost, said spool is permitted to move to, first allow said valve to close said first passage and then separate from said stem so as to open said bore and thus said second passage.

6. In an anti-skid device for a braking system including a master cylinder and at least one wheel cylinder and associated with a pump, as a source of an actuating pressure, said anti-skid device,
- a first passageway communicable with the master cylinder which is operable to perform an anti-skid operation;
- a second passageway communicable with the master cylinder; and
- a valve device which includes:
- a chamber communicable with the wheel cylinder, said chamber including a first opening at which said first passageway terminates in and a second opening at which said second passageway terminates in;
- a valve including a valve member for closing said first opening and a valve stem extending through said first opening toward said second opening; and
- an actuator for said valve including a pressure responsive piston means formed with said second opening, said pressure responsive piston means being operable in response to the actuating pressure, said pressure responsive piston means being constructed and arranged such that said valve member is held out of contact with said first opening via abutment between said pressure responsive piston means and said valve stem, which abutment closes said second opening, until said actuating pressure disappears and said pressure responsive piston means moves to, first allow said valve member to seat on said first opening and thereafter moves out of contact with said stem to open said second opening.

7. An anti-skid device as claimed in claim 6, wherein said valve member is integral with a second piston means which is exposed to hydraulic pressure from said master cylinder to be biased in a direction which moves said valve member toward said first opening.

8. An anti-skid device as claimed in claim 7, including a spring urging said valve member toward a closed position thereof in which said first opening is covered.

9. An anti-skid device as claimed in claim 6, including a pressure regulator means for regulating a pressure within a regulator chamber to which said first pressure responsive piston means is exposed, said pressure regulator means including a plunger means received in said first pressure responsive piston means, said plunger means being responsive to a pressure within said second passageway and a pressure within a regulator chamber.

* * * * *